(12) United States Patent
Higo et al.

(10) Patent No.: US 12,126,519 B2
(45) Date of Patent: Oct. 22, 2024

(54) CONTROL APPARATUS, CONTROL METHOD AND PROGRAM

(71) Applicant: Nippon Telegraph and Telephone Corporation, Tokyo (JP)

(72) Inventors: Naoki Higo, Musashino (JP); Ryota Ishibashi, Musashino (JP); Yuki Nakahara, Musashino (JP); Takeshi Kuwahara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 348 days.

(21) Appl. No.: 17/781,917

(22) PCT Filed: Dec. 3, 2019

(86) PCT No.: PCT/JP2019/047241
§ 371 (c)(1),
(2) Date: Jun. 2, 2022

(87) PCT Pub. No.: WO2021/111523
PCT Pub. Date: Jun. 10, 2021

(65) Prior Publication Data
US 2023/0007919 A1 Jan. 12, 2023

(51) Int. Cl.
*H04L 45/12* (2022.01)
*H04L 45/00* (2022.01)
*H04L 45/74* (2022.01)

(52) U.S. Cl.
CPC ............ *H04L 45/126* (2013.01); *H04L 45/72* (2013.01); *H04L 45/74* (2013.01)

(58) Field of Classification Search
CPC ....... H04L 45/126; H04L 45/72; H04L 45/74; H04W 40/20; H04W 48/16; H04W 48/20
See application file for complete search history.

(56) References Cited

U.S. PATENT DOCUMENTS

2005/0152318 A1* 7/2005 Elbatt ..................... H04W 4/00
370/338
2005/0255848 A1* 11/2005 Cohen ..................... H04L 45/02
455/445

(Continued)

OTHER PUBLICATIONS

[No Author Listed] [online], "Auto-scaling (Zero-scale)," OpenFaaS, available on or before May 5, 2018, retrieved on Nov. 21, 2019, retrieved from URL <https://docs.openfaas.com/architecture/autoscaling/#zero-scale>, 4 pages.

(Continued)

*Primary Examiner* — Luat Phung
(74) *Attorney, Agent, or Firm* — Fish & Richardson P.C.

(57) ABSTRACT

A control device includes an information acquisition unit that receives a source address of a packet from a node that receives the packet transmitted from a user terminal, and acquires position information about the user terminal on a basis of the source address, a determination unit that determines a hub to which the user terminal should connect, on a basis of the position information, and a control execution unit that launches an application in the hub and changes a routing such that packets transmitted from the user terminal are transmitted to the application.

15 Claims, 19 Drawing Sheets

(56) References Cited

U.S. PATENT DOCUMENTS

| | | | |
|---|---|---|---|
| 2008/0005226 A1* | 1/2008 | Subbian | H04L 51/58 |
| | | | 709/202 |
| 2008/0051033 A1* | 2/2008 | Hymes | H04W 4/02 |
| | | | 455/47 |
| 2011/0075557 A1* | 3/2011 | Chowdhury | H04L 12/14 |
| | | | 370/235 |
| 2017/0078185 A1* | 3/2017 | Yao | H04L 45/20 |
| 2019/0079804 A1* | 3/2019 | Thyagarajan | G06F 9/5077 |
| 2019/0132190 A1* | 5/2019 | Jeyakumar | H04L 41/0631 |
| 2019/0222518 A1* | 7/2019 | Bernat | H04L 41/5051 |

OTHER PUBLICATIONS

Ellis [online], "Scale to Zero and Back Again with OpenFaaS," OpenFaaS, Jul. 25, 2018, retrieved from URL <https://www.openfaas.com/blog/zero-scale/>, 8 pages.

* cited by examiner

CONTROL APPARATUS, CONTROL METHOD AND PROGRAM

CROSS-REFERENCE TO RELATED APPLICATIONS

This application is a National Stage application under 35 U.S.C. § 371 of International Application No. PCT/JP2019/047241, having an International Filing Date of Dec. 3, 2019. The disclosure of the prior application is considered part of the disclosure of this application, and is incorporated in its entirety into this application.

TECHNICAL FIELD

The present invention relates to a technology that controls communication for the use of an application on a user terminal.

BACKGROUND ART

Recently, edge computing, in which service processing is performed at locations close to a user terminal or device (hereinafter referred to as the user terminal), is proliferating.

With edge computing, computational resources such as an application server are distributively installed at each hub, and the user terminal uses an application running on the computational resources of a hub close to the user terminal itself.

If the application is running but not being used, computational resources will be wasted. Accordingly, a technology called Scale to Zero has been proposed in which an application is launched after a request is received (Non-Patent Literature 1, 2).

CITATION LIST

Non-Patent Literature

Non-Patent Literature 1: OpenFaaS "Auto-scaling(Zero-scale)", https://docs.openfaas.com/architecture/autoscaling/#zero-scale, Internet, retrieved 21 Nov. 2019

Non-Patent Literature 2: OpenFaaS "Scale to Zero and Back Again with OpenFaaS", https://www.openfaas.com/blog/zero-scale/, Internet, retrieved 21 Nov. 2019

SUMMARY OF THE INVENTION

Technical Problem

With a technology that launches an application after receiving a request like the related technology above, it is necessary for the user terminal to discover the nearest hub and transmit a request for using an application in the hub. However, achieving the above necessitates a complex process, and is not preferable for a user terminal with limited computational resources.

The present technology has been devised in light of the above points, and an objective thereof is to provide a technology enabling a user terminal to use an application in the nearest hub without performing a complex process.

Means for Solving the Problem

According to the technology of the disclosure, there is provided a control device comprising:

an information acquisition unit that receives a source address of a packet from a node that receives the packet transmitted from a user terminal, and acquires position information about the user terminal on a basis of the source address;

a determination unit that determines a hub to which the user terminal should connect, on a basis of the position information; and a control execution unit that launches an application in the hub and changes a routing such that packets transmitted from the user terminal are transmitted to the application.

Effects of the Invention

According to the technology of the disclosure, a technology enabling a user terminal to use an application in the nearest hub without performing a complex process can be provided.

DESCRIPTION OF EMBODIMENTS

Hereinafter, an embodiment of the present invention will be described with reference to the drawings. The embodiment described hereinafter is merely an example, and embodiments to which the present invention is applied are not limited to the following embodiment.

(System Configuration)

Figure 1:
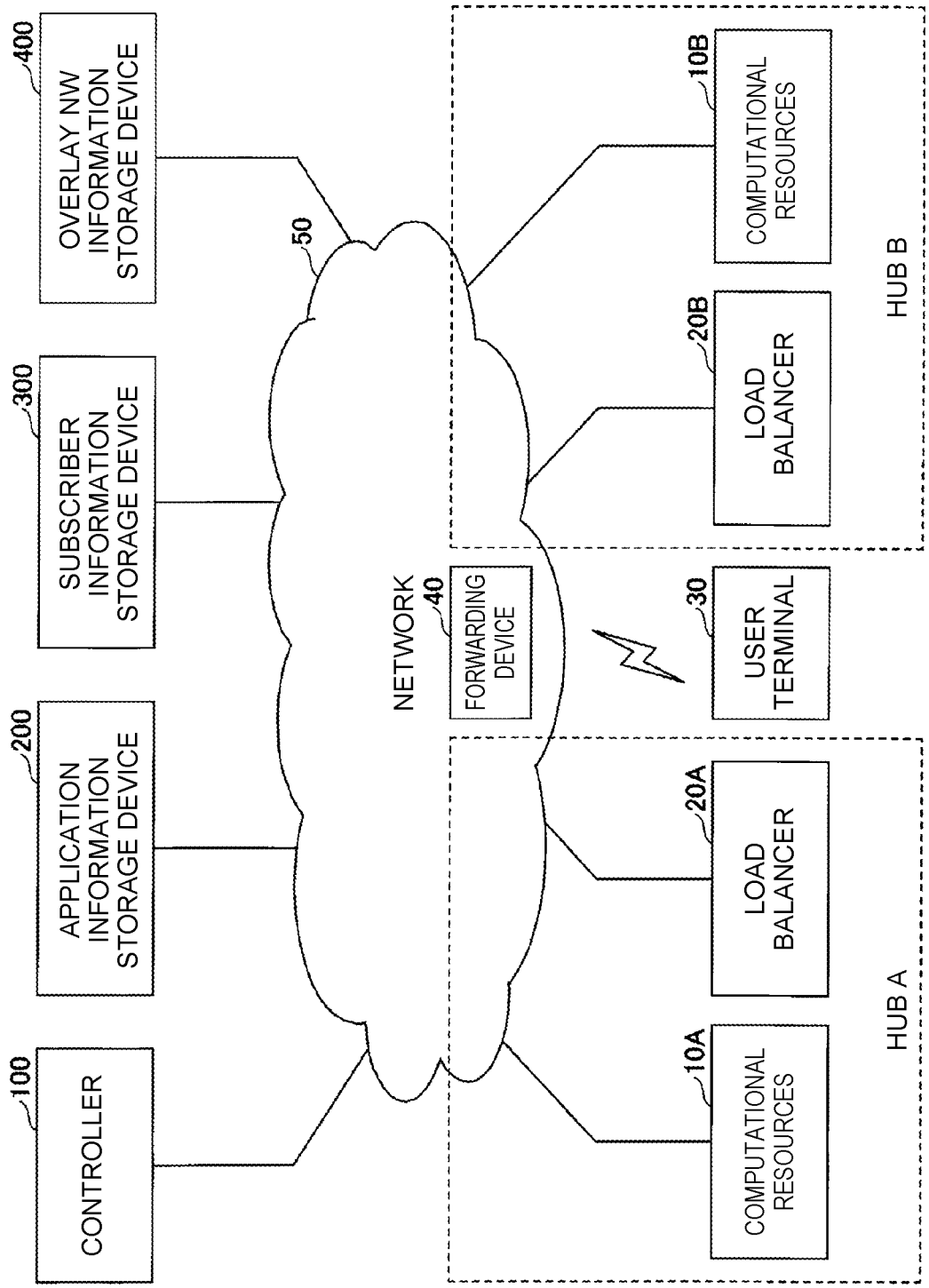
FIG. 1 is an overall configuration diagram of a system according to an embodiment of the present invention.

FIG. 1 illustrates an overall configuration example of a system according to the embodiment of the present invention. In FIG. 1, a hub A and a hub B are illustrated as examples of hubs, but these are an example, and in actuality, more hubs exist. Hereinafter, when the hub A and the hub B are not being distinguished, the signs "A" and "B" will not be appended, as in the "computational resources 10" and the "load balancer 20" for example.

In the embodiment, a "hub" is assumed to be a location (such as a building, a mobile phone base station, a telephone exchange, a building in which transmission equipment/forwarding equipment related to the provision of network services, or a geographical area, for example) provided with facilities such as computational resources 10 and a load balancer 20. A "hub" may also be a location (such as a data center including a server group, for example) with facilities that provide cloud services.

As illustrated in FIG. 1, the system includes a controller 100, an application information storage device 200, a subscriber information storage device 300, an overlay NW information storage device 400, and computational resources 10 and a load balancer 20 in each hub, which are connected to a network 50. Note that the application information storage device 200 is used in Examples 1 and 2. The subscriber information storage device 300 is used in Examples 2-1 and 2-2. The overlay NW information storage device 400 is used in Example 2-2. The application information storage device 200, the subscriber information storage device 300, and the overlay NW information storage device 400 are collectively referred to as storage devices.

The network 50 is a for example a network including a mobile network (for example, a 5G network) and a data network (for example, the Internet). One or more forwarding devices 40 exist on the network 50. For example, a user terminal 30 wirelessly connects to a 5G network and communicates with an application that runs on the computational resources 10 through the 5G network and the data network.

The controller 100, the application information storage device 200, the subscriber information storage device 300, the overlay NW information storage device 400, the computational resources 10, the load balancer 20, and the forwarding device 40 may all be achieved by physical devices (such as servers and communication devices), but may also be achieved by virtual machines such as the cloud, or by virtual containers that run using a container runtime such as Docker or CRI-O, for example.

The controller 100 is a device that controls each of the computational resources 10, the load balancer 20, and the forwarding device 40.

Note that in the case where the computational resources 10, the load balancer 20, the forwarding device 40, and the like are in the cloud, the control of the computational resources 10, the load balancer 20, the forwarding device 40, and the like by the controller 100 is achieved through a cloud management device.

The application information storage device 200 stores correspondence information associating position information about each hub with an IP address and position information for each user terminal. The subscriber information storage device 300 and the overlay NW information storage device 400 will be described later.

The computational resources 10 are a device that executes an application, and may also be referred to as an application server. Note that an application in the embodiment may be an application with any type of functions, and for example, the application analyzes video data received from the user terminal 30 and transmits an analysis result to the user terminal 30 or a higher-layer server.

Also, in the embodiment, Scale to Zero technology is applied. In other words, in the computational resources 10, the application is not launched in cases where there is no demand to use the application from the user terminal 30. Note that the application not being launched also includes the computational resources 10 not being launched.

The load balancer 20 is a device that distributes requests for the application among the plurality of computational resources. The load balancer 20 of the embodiment is an L4-7 load balancer, for example. The load balancer 20 of the embodiment has a function of acquiring the source address of a packet received from the user terminal 30 and notifying the controller 100 of the source address.

Note that in this specification, the source address is described specifically as a source IP address as an example. However, the source address is not limited to a source IP address, and may be any address that can be used to uniquely identify the source terminal. For example, the MAC address may also be used as the source address.

The user terminal 30 is a smartphone, a PC, an IoT device, or the like. The forwarding device 40 is a Layer 3 (L3) switch that forwards packets on the basis of the IP address, for example. The forwarding device 40 may also be a device forming the User Plane Function (UPF) on a 5G network.

Figure 2:
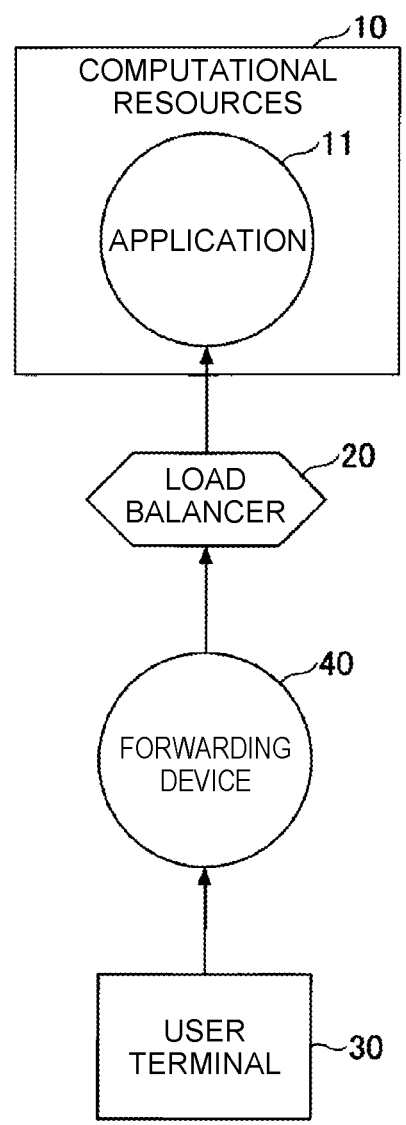
FIG. 2 is a diagram illustrating a communication configuration in the case where a user terminal uses an application at a certain hub.

FIG. 2 illustrates an example of communication in the case where the user terminal 30 accesses an application 11 running on the computational resources 10. As illustrated in FIG. 2, when the user terminal 30 transmits a packet containing processing request data for the application 11, the packet goes through the forwarding device 40 and the load balancer 20 to reach the computational resources 10, is delivered to the application 11 inside the computational resources 10, and the application 11 executes processing according to the processing request.

Note that the packet transmitted from the user terminal 30 needs to go through an interface or the like of the computational resources 10 before arriving at the application 11 (specifically, a process running on the computational resources 10). For convenience, "transmitting (forwarding) a packet to an application" is taken to mean transmitting the packet to the computational resources 10 and handing over data contained in the packet to the application inside the computational resources 10.

(Overview of Operations by System)

FIGS. 3 to 6 will be referenced to describe an overview of operations by the system according to the embodiment. Here, in a situation where the application 11A of the hub A is being used from the user terminal 30A but the application 11B of the hub B has not been launched, suppose that the user terminal B is positioned nearest to the hub B and wants to use the application 11. Also, assume that other hubs besides the hub A and hub B exist, and of the multiple hubs where the application 11 has been launched (such as hub A, hub A', and hub A"), the hub A is the hub closest to the user terminal 30B.

Note that terms such as "near(est)" and "close" used in this specification may refer a short physical distance, a short distance over the network (number of hops or the round-trip time (RTT)), a small number of AS to go through, or a small number of NW operators to go through.

Figure 3:
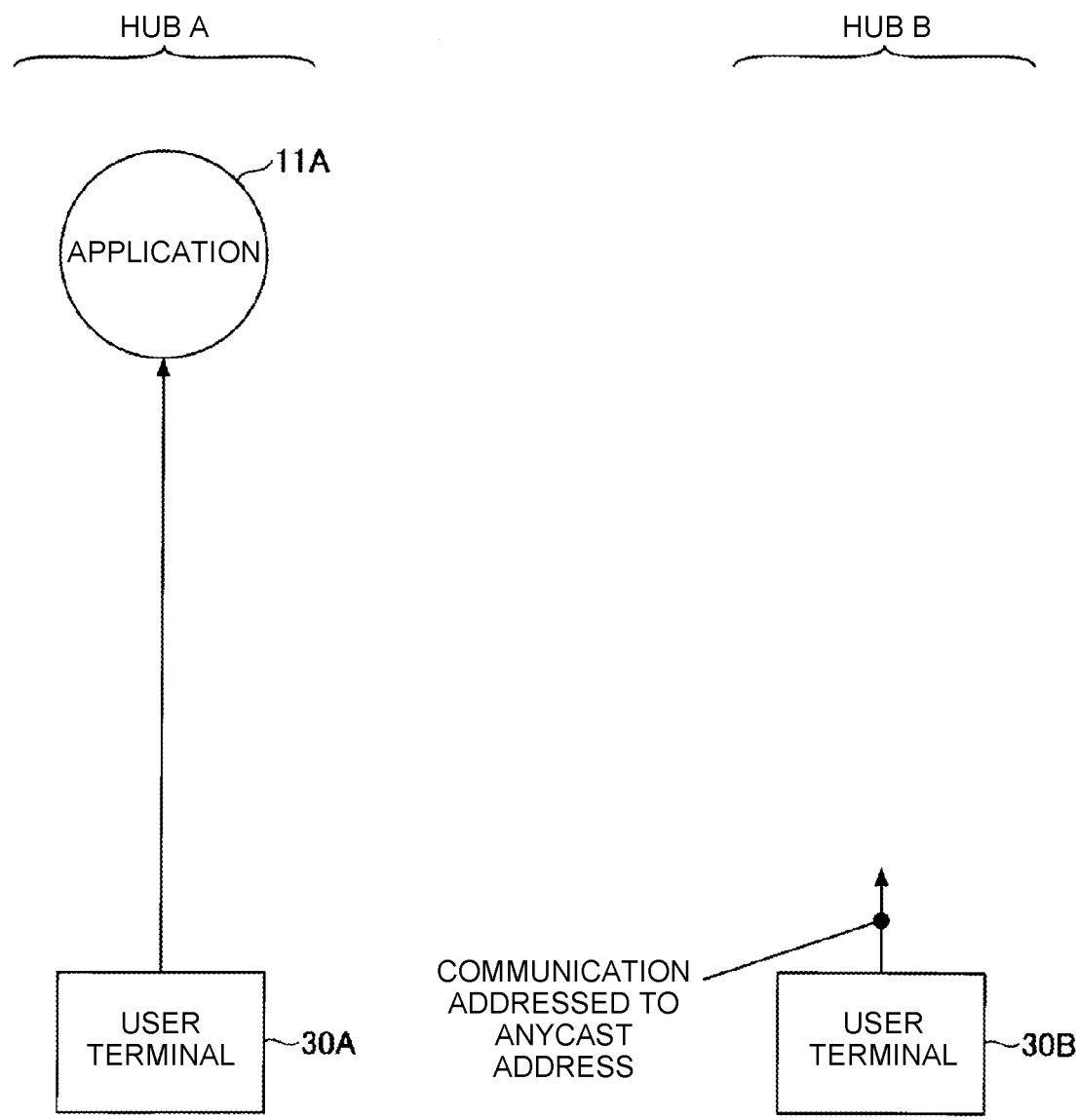
FIG. 3 is a diagram for explaining an overview of communication operations.

As illustrated in FIG. 3, first, the user terminal 30B transmits a packet addressed to the anycast address. The packet is a packet requesting processing with respect to the application 11.

A portion of all of the nodes (such as the load balancer 20, the computational resources 10, and the forwarding device 40) in the embodiment are assigned the anycast address that acts as an IP address, and in the case where a packet addressed to the anycast address is transmitted from a source user terminal 30, the packet is forwarded to the node which has the anycast address and which is closest to the user terminal 30.

Figure 4:
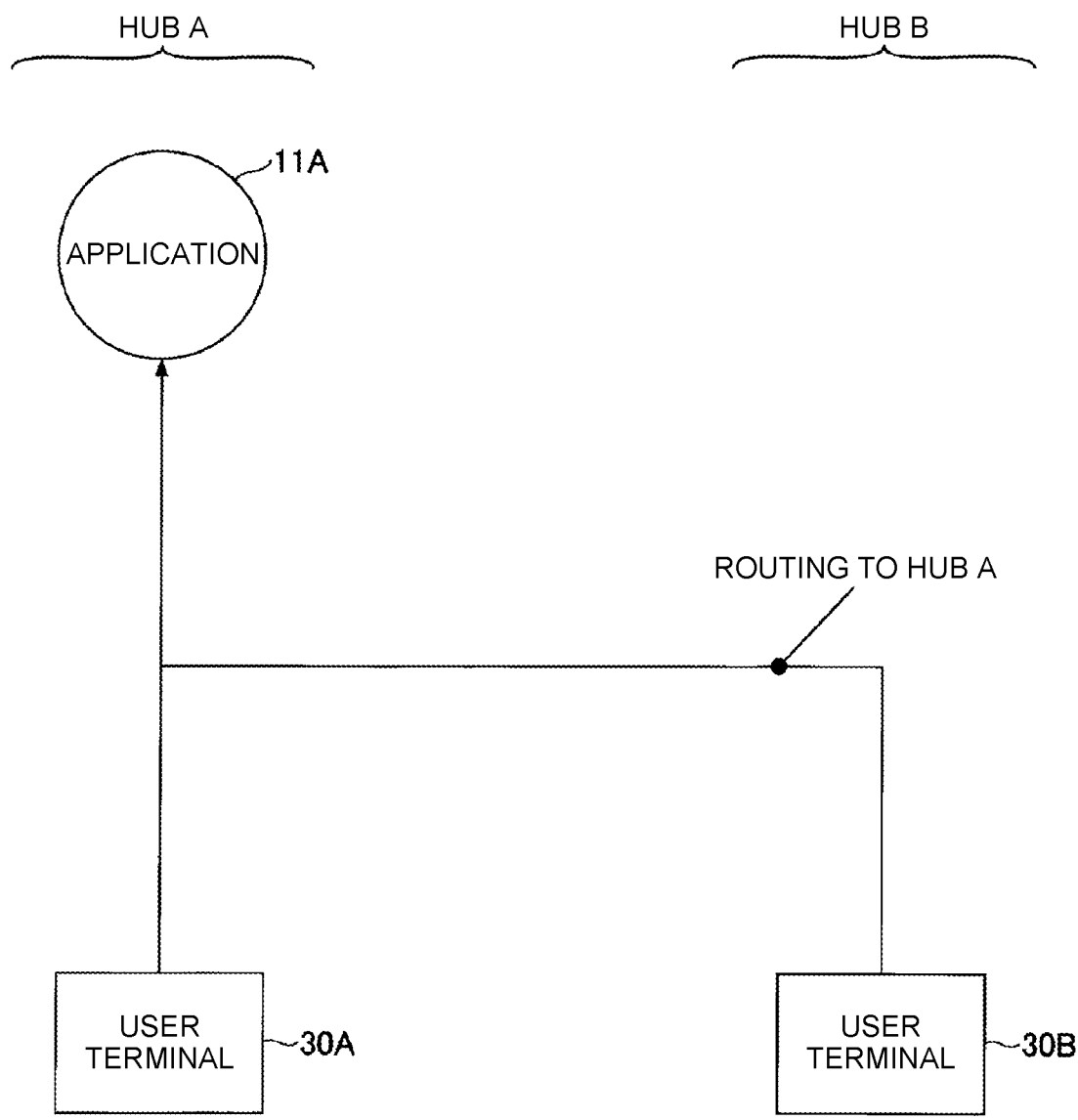
FIG. 4 is a diagram for explaining an overview of communication operations.

Here, according to a mechanism described later, the packet addressed to the anycast address and transmitted from the user terminal 30B is forwarded to the application 11A of the hub A, as illustrated in FIG. 4. With this arrangement, the user terminal 30B can use the application 11A.

Figure 5:
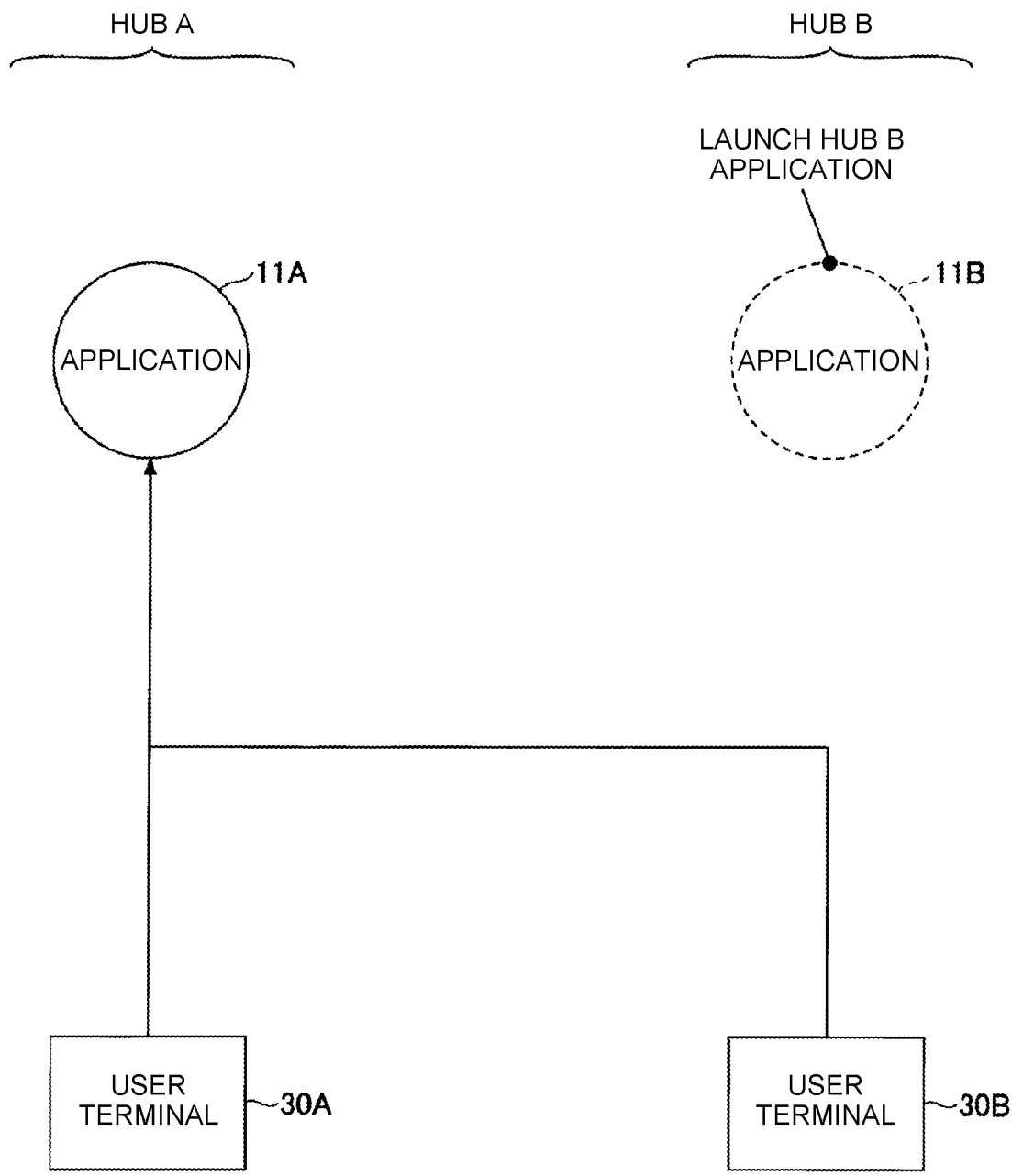
FIG. 5 is a diagram for explaining an overview of communication operations.
Figure 6:
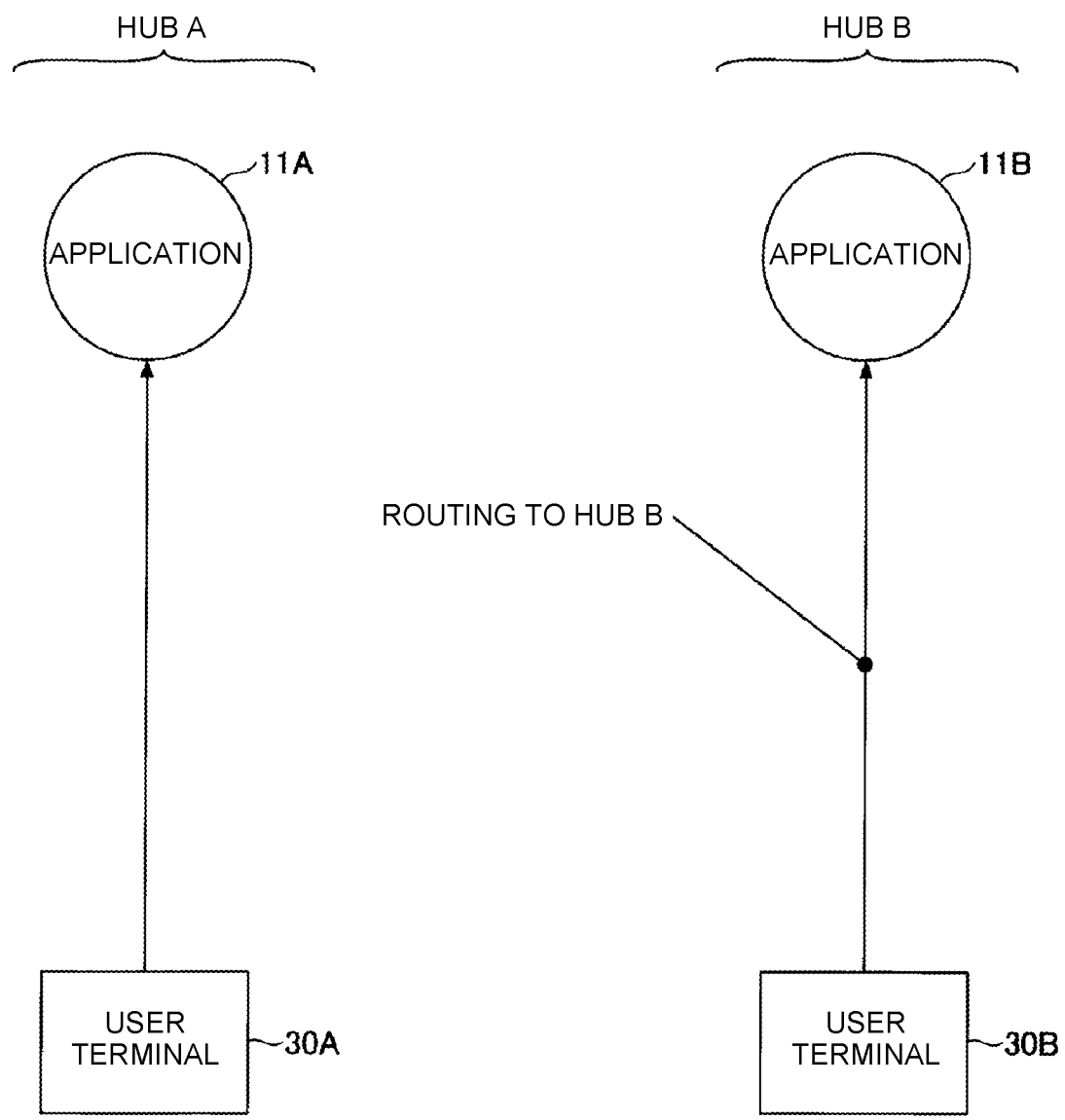
FIG. 6 is a diagram for explaining an overview of communication operations.

Next, the application 11B of the hub B is launched under control by the controller 100, as illustrated in FIG. 5. Next, the packet transmitted from the user terminal 30B is routed to the application 11B under control by the controller 100, as illustrated in FIG. 6. With this arrangement, the user terminal 30B can use the application 11B.

Through a process like the above, the user terminal 30B is capable of using the application 11B in the nearest hub B without performing a complex process. Also, as illustrated in FIG. 4, because packets are routed to the application 11A until the application 11B is launched, the user terminal 30B can start using the application 11 with low latency.

(Configuration of Controller 100)

Figure 7:
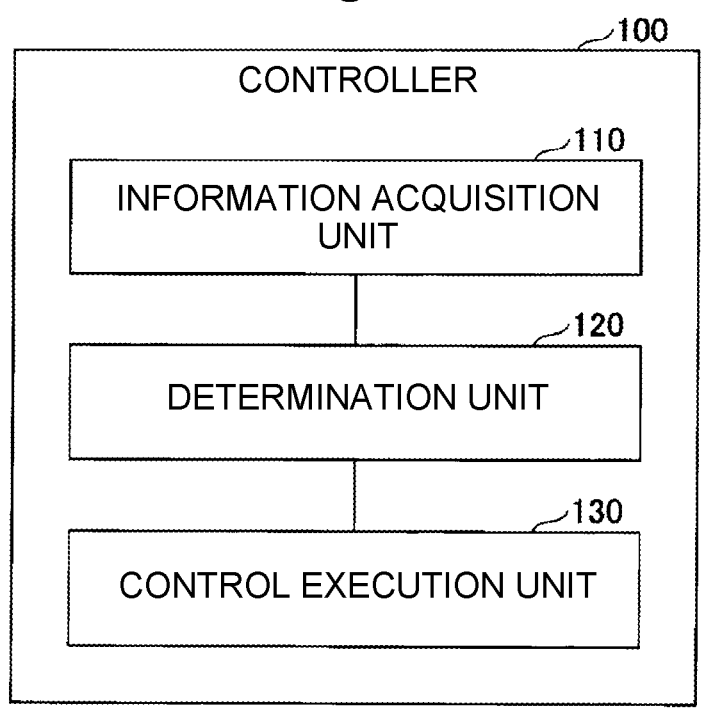
FIG. 7 is a functional configuration diagram of a control device.

FIG. 7 illustrates a functional configuration diagram of the controller 100. As illustrated in FIG. 7, the controller 100 includes an information acquisition unit 110, a determination unit 120, and a control execution unit 130. Note that the controller 100 may also be referred to as a control device.

The information acquisition unit 110 acquires the source address of the user terminal 30 from the load balancer 20. Also, the information acquisition unit 110 acquires position information and the like about the user terminal 30 from a storage device by issuing a query based on the source address to the storage device.

The determination unit 120 determines the hub to which the user terminal 30 should connect on the basis of the information acquired by the information acquisition unit 110. The hub to which the user terminal 30 should connect refers to the hub closest to the user terminal 30. Also, "connecting to a hub" refers to communicating with the computational resources 10 of the hub to use an application.

The control execution unit 130 controls the load balancer 20, the forwarding device 40, the computational resources 10, and the like on the basis of the content determined by the determination unit 120.

(Hardware Configuration Example)

The load balancer 20, the control device 100, the storage devices 200 to 400, and the forwarding device 40 are all achievable by causing a computer to execute a program stating the processing content described in the embodiment. Note that the "computer" may also be a virtual machine or a virtual container provided by an infrastructure service in which computational resources such as cloud services are operated as a virtual machine or a virtual container. In the case of using a virtual machine, the "hardware" described herein refers to virtual hardware.

The devices (the load balancer 20, the control device 100, the storage devices 200 to 400, and the forwarding device 40) are achievable by using hardware resources such as a CPU and memory built into the computer to execute a program corresponding to the processes performed in the devices. The program may be saved and distributed by being recorded onto a computer-readable medium (such as portable memory). In addition, the program may also be provided through a network, such as the Internet or email.

Figure 8:
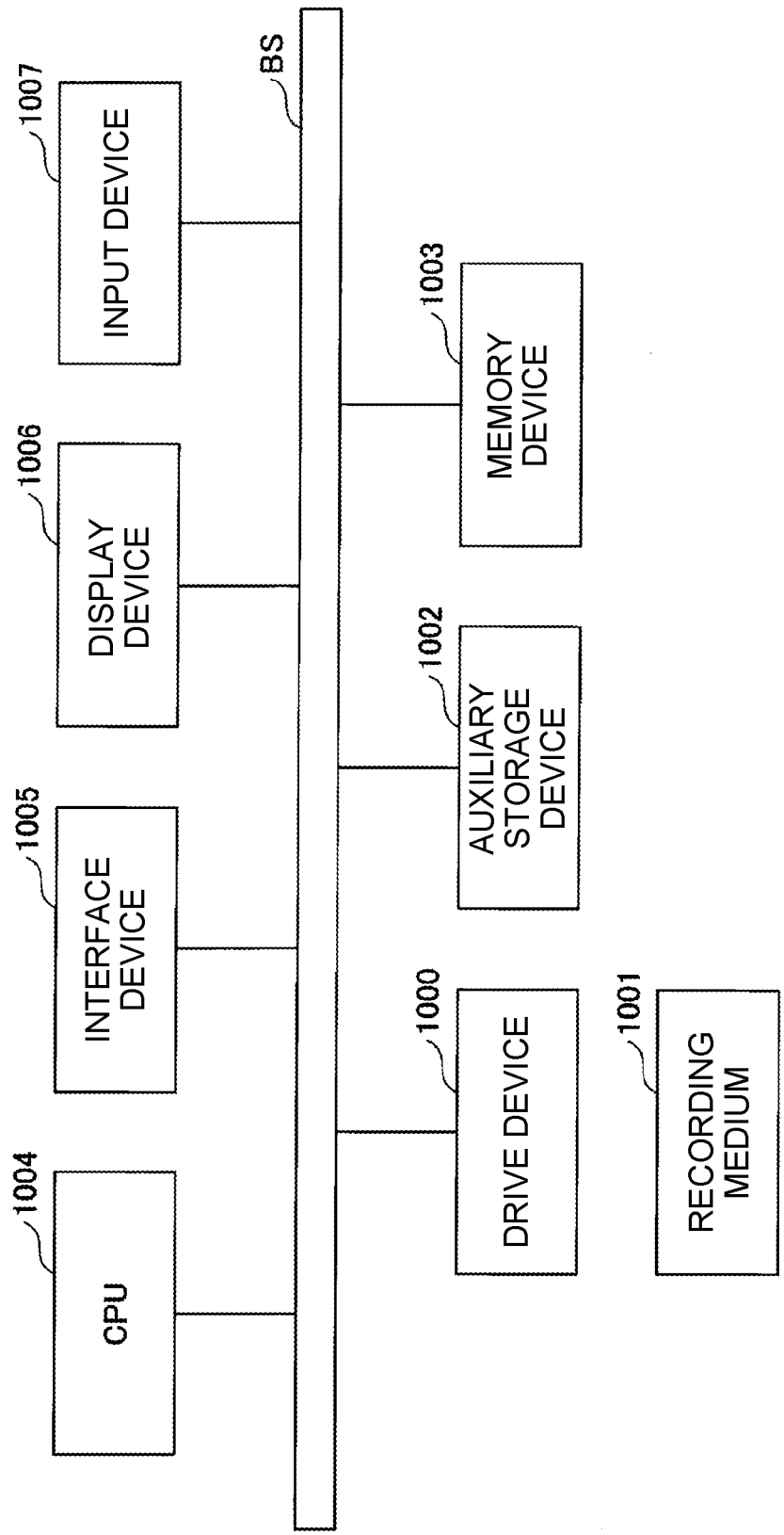
FIG. 8 is a diagram illustrating a hardware configuration example of a device.

FIG. 8 is a diagram illustrating a hardware configuration example of the computer according to the embodiment. The computer in FIG. 8 includes components such as a drive device 1000, an auxiliary storage device 1002, a memory device 1003, a CPU 1004, an interface device 1005, a display device 1006, and an input device 1007, which are interconnected by a bus B.

A program that achieves processing on the computer is provided by a recording medium 1001 such as a CD-ROM or a memory card, for example. When the recording medium 1001 is placed in the drive device 1000, the program is installed from the recording medium 1001 to the auxiliary storage device 1002 through the drive device 1000. However, the program does not necessarily have to be installed from the recording medium 1001, and may also be downloaded from another computer over a network. The auxiliary storage device 1002 stores the installed program, and also stores information such as necessary files and data.

When an instruction to launch the program is given, the memory device 1003 reads out and stores the program from the auxiliary storage device 1002. The CPU 1004 achieves functions related to the devices by following the program stored in the memory device 1003. The interface device 1005 is used as an interface for connecting to a network. The display device 1006 displays a graphical user interface (GUI) according to the program. The input device 1007 includes components such as a keyboard and mouse, buttons, or a touch panel, and is used to input various operation instructions. Note that in the case where operation over the network is presumed, the display device 1006 and the input device 1007 do not have to be provided.

Hereinafter, specific working examples of the system according to the embodiment will be described as Example 1, Example 2, Example 2-1, and Example 2-2.

Example 1

First, FIGS. 9 to 12 will be referenced to describe Example 1 in step number order (S101 to S104). Example 1 is an example of the case where the application 11 and the load balancer 20 are separated. Also, the application information storage device 200 stores correspondence information associating IP addresses with position information, as well as position information about each hub.

<FIG. 9: S101>

Figure 9:
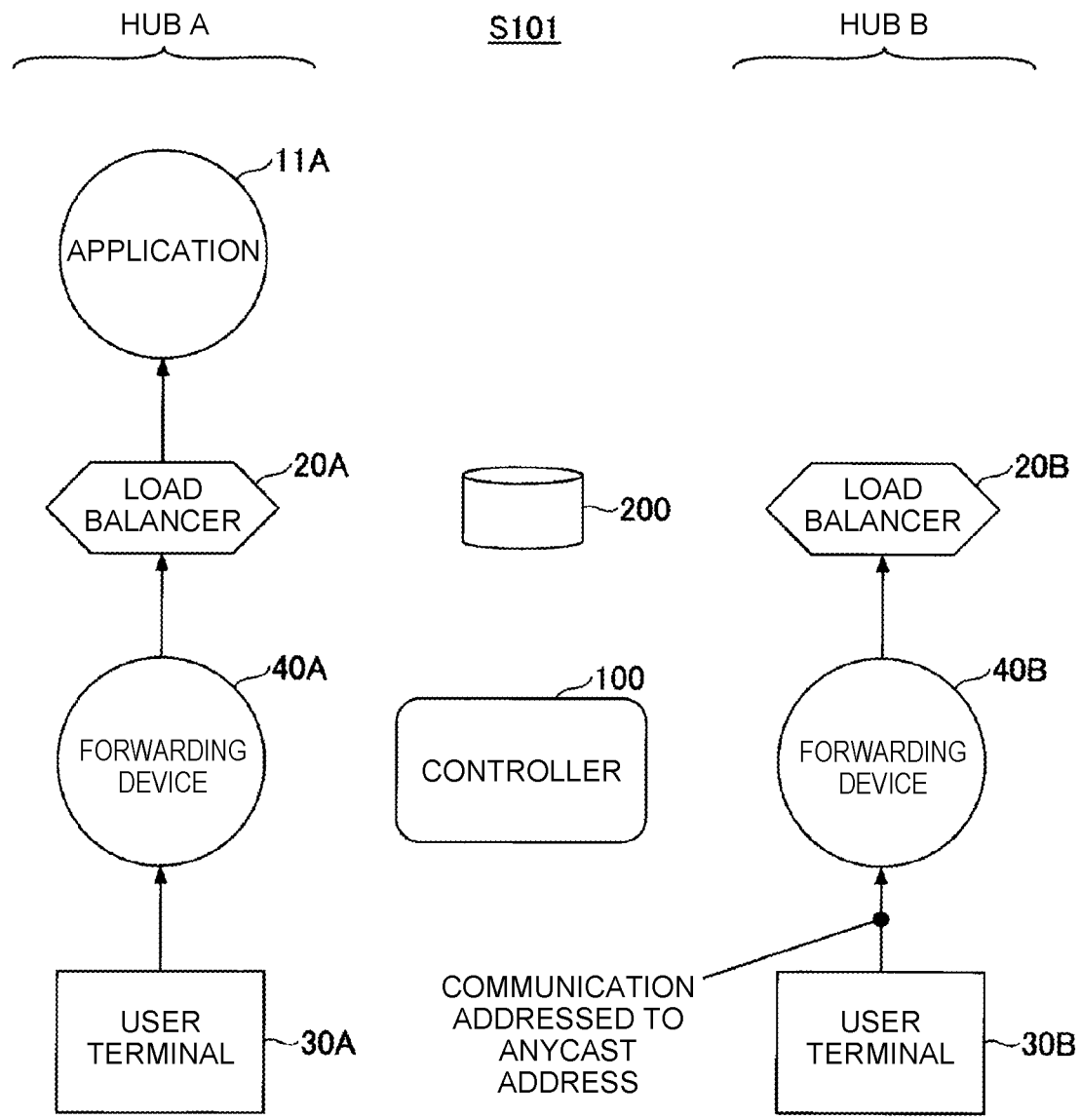
FIG. 9 is a diagram for explaining communication operations in Example 1.

As illustrated in FIG. 9, in S101, the application 11A of the hub A has been launched, and the user terminal 30A is using the application 11A. In the hub B, the application 11B has not been launched. Also, a user terminal 30B wanting to use the application 11 exists. The hub closest to the user terminal 30B is the hub B.

The user terminal 30B transmits a packet addressed to the anycast address requesting the use of the application 11. The packet arrives at the load balancer 20B, which is the nearest of the nodes assigned the anycast address. Note that in Example 1, the anycast address is not assigned to the forwarding device 40B.

<FIG. 10: S102>

Figure 10:
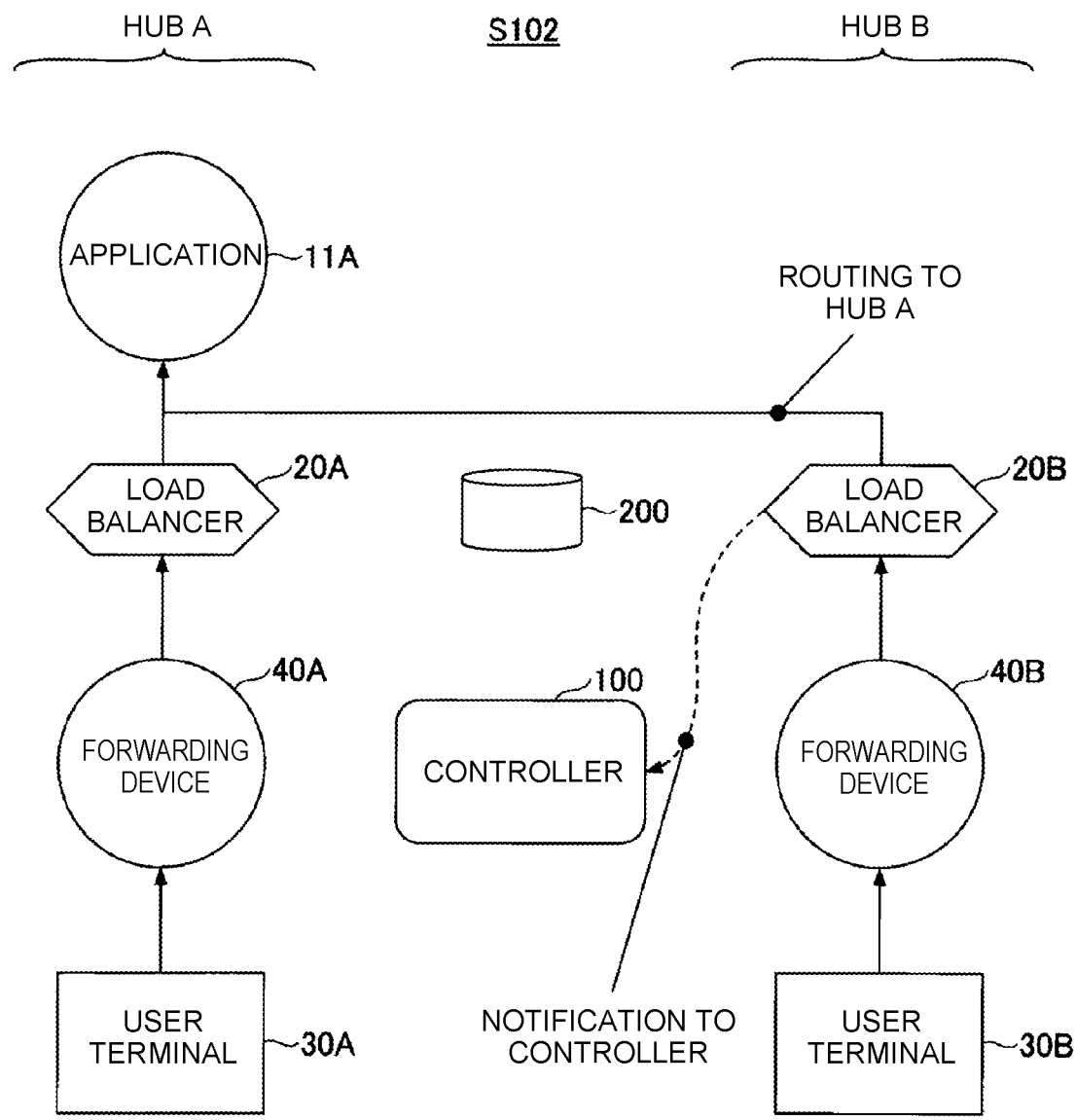
FIG. 10 is a diagram for explaining communication operations in Example 1.

In S102 illustrated in FIG. 10, the load balancer 20B receiving the packet from the user terminal 30B temporarily assigns communication with the user terminal 30B to the application 11A launched in the hub A. In other words, packets arriving at the load balancer 20B from the user terminal 30B are temporarily addressed to the application 11A and forwarded to the application 11A. The forwarding is performed on the basis of the load balancer 20B detecting that the application 11B has not been launched, for example.

With this arrangement, the user terminal 30B communicates with the application 11A until the routing is switched (until the application 11B is launched) as described later.

The load balancer 20B notifies the controller 100 with information indicating that communication from the user terminal 30B, which should have been connected to the hub B originally, has been assigned to another hub. The information includes the source address of the packets received from the user terminal 30B. In the controller 100, the information acquisition unit 110 acquires the information.

<FIG. 11: S103>

Figure 11:
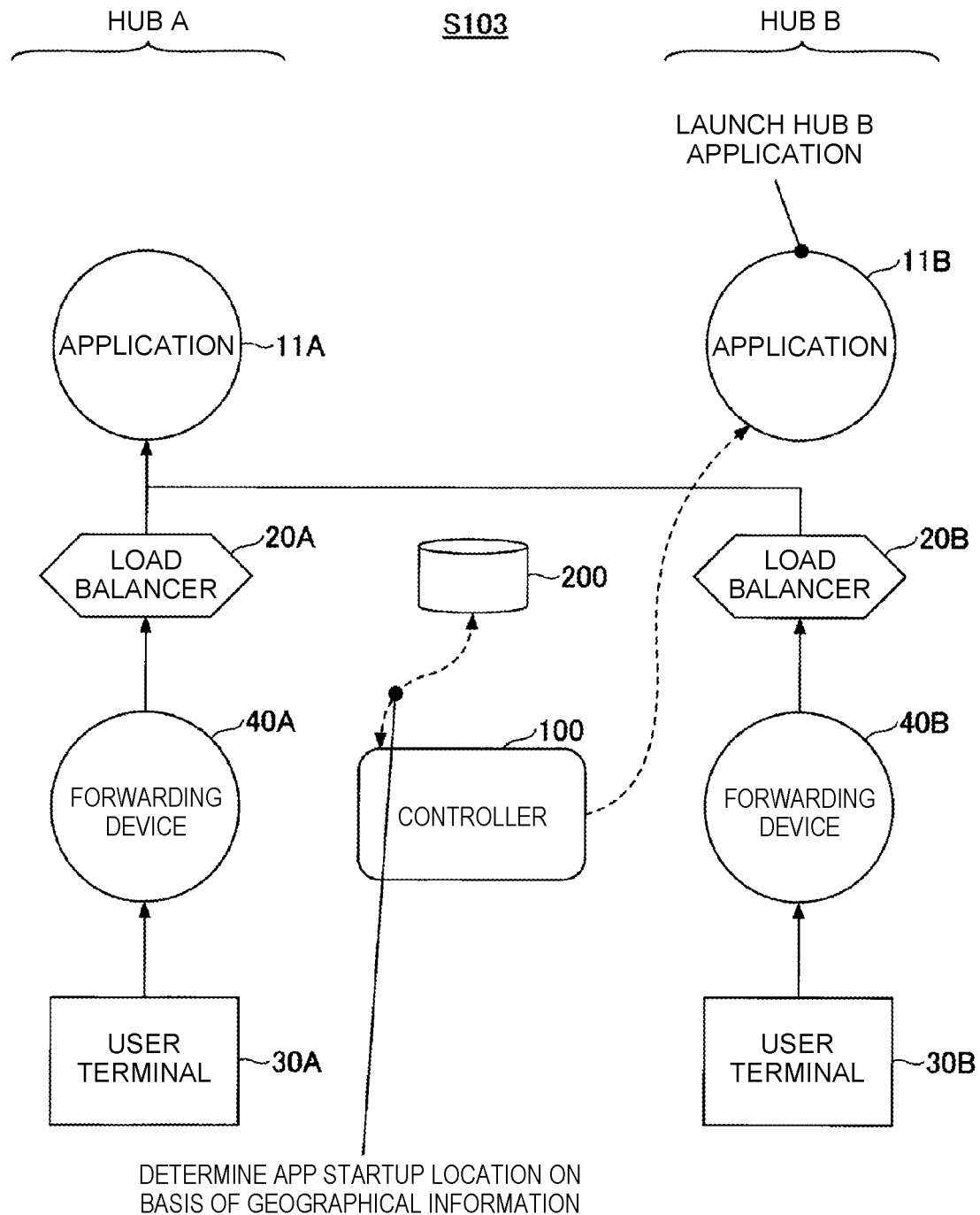
FIG. 11 is a diagram for explaining communication operations in Example 1.

Next, in S103 of FIG. 11, the information acquisition unit 110 of the controller 100 transmits the source address (the IP address of the user terminal 30B) acquired from the load balancer 20B to the application information storage device 200.

On the basis of the correspondence information, the application information storage device 200 acquires position information corresponding to the source address (position information about the user terminal 30B) and the position information about each hub, and transmits the acquired information to the controller 100.

The information acquisition unit 110 of the controller 100 acquires the position information about the user terminal 30B and the position information about each hub from the application information storage device 200. Next, on the basis of the position information about the user terminal 30B and the position information about each hub, the determination unit 120 of the controller 100 determines that the hub nearest to the user terminal 30B is the hub B, and determines to launch the application 11B in the hub B. The control execution unit 130 of the controller 100 launches the application 11B in the hub B.

Note that the control execution unit 130 launching the application 11B in the hub B may refer to instructing the computational resources 10B of the hub B to launch the application 11B, or instructing a management device of the infrastructure such as the cloud in which a virtual machine or virtual container running on the computational resources 10B are operated to launch the application 11B.

<FIG. 12: S104>

Figure 12:
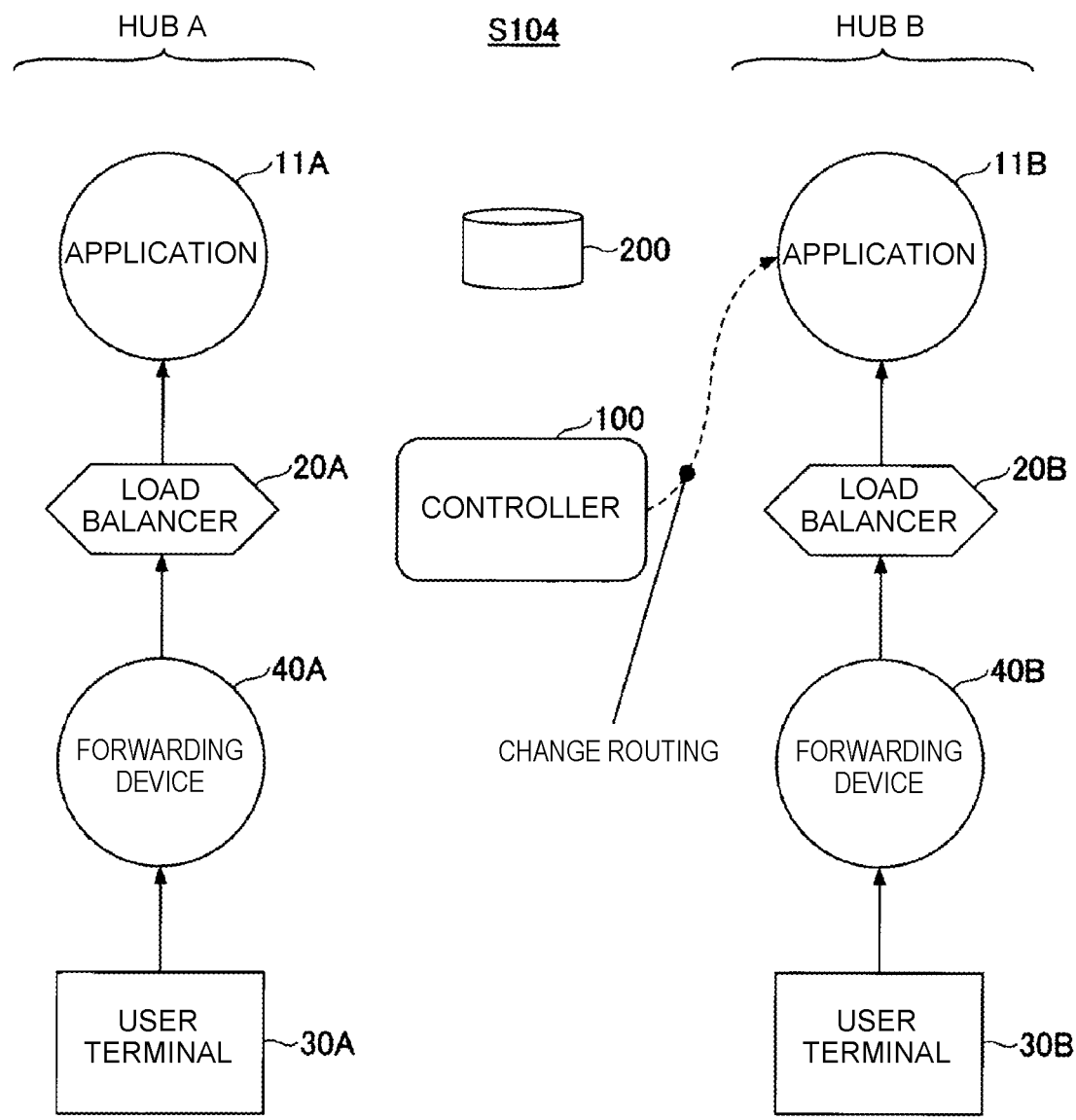
FIG. 12 is a diagram for explaining communication operations in Example 1.

In S104 of FIG. 12, if the determination unit 120 of the controller 100 determines that the application 11B has entered a standby state, the control execution unit 130 instructs the load balancer 20B to change the routing such that packets sent from the user terminal 30B to the load balancer 20B are forwarded to the application 11B. Thereafter, packets sent from the user terminal 30B to the load balancer 20B are forwarded to the application 11B.

To determine that the application 11B has entered a standby state, the standby state may be determined after a predetermined time has elapsed since the launch instruction, an ICMP packet (for example, an ICMP echo request) in L3 addressed to the IP address of the computational resources 10B running the application 11B may be sent and the standby state may be determined if there is a response, the initiation of a TCP session with a standby port of the application 11B may be attempted and the standby state may be determined if a connection is established, or an application layer service initiation request may be transmitted to the application 11B and the standby state may be determined if there is a response.

Example 2

Next, FIGS. 13 to 16 will be referenced to describe Example 2 in step number order (S201 to S204). Example 2 is an example of the case where the application 11B and the load balancer 20B are combined in the hub B. The application 11B and the load balancer 20B being combined means that, for example, the load balancer 20B is a type of application that is launched and made to run on computational resources, with the application 11B and the load balancer 20B functioning as a set (either one does not function alone).

<FIG. 13: S201>

Figure 13:
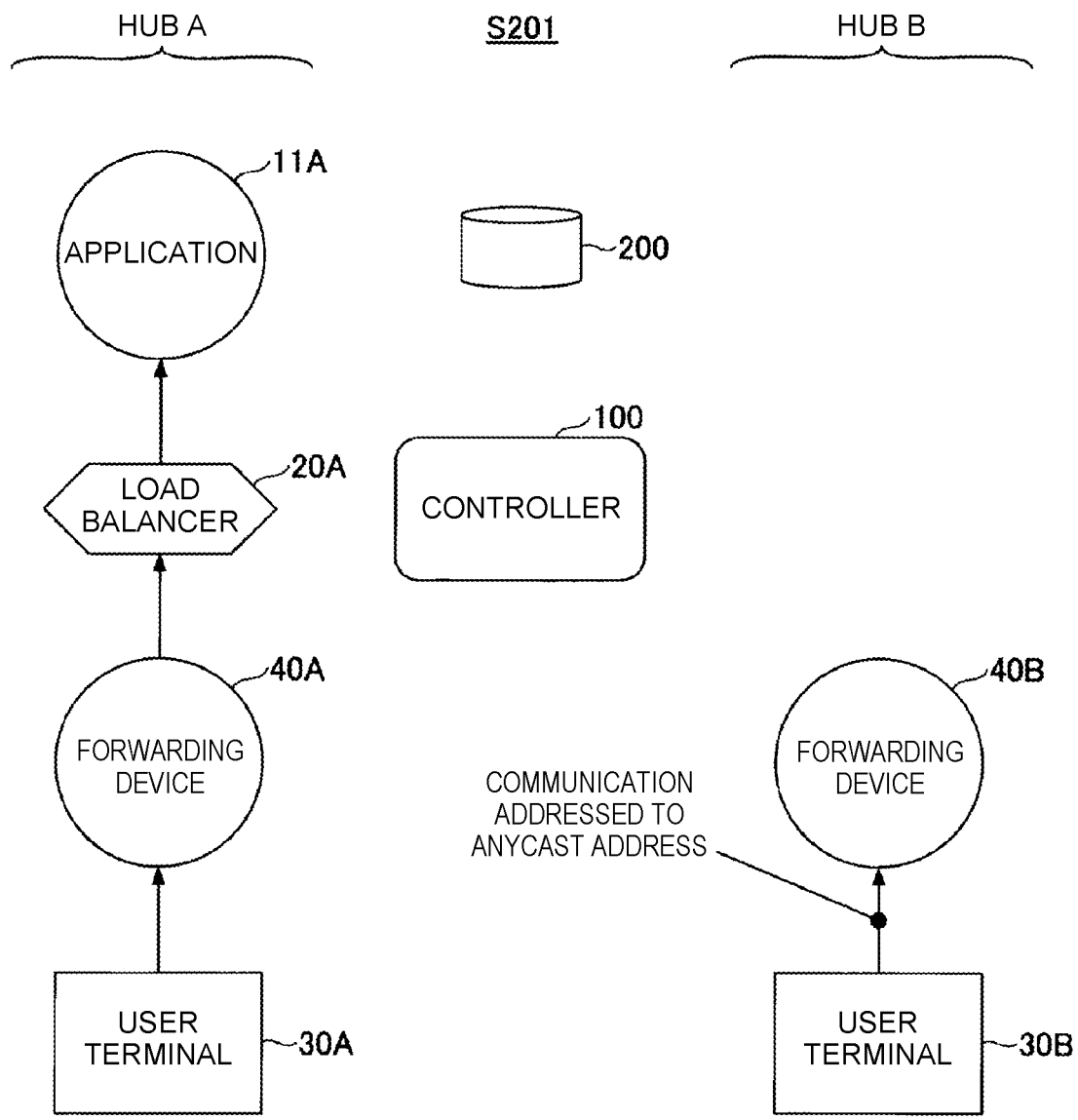
FIG. 13 is a diagram for explaining communication operations in Example 2.

In S201 of FIG. 13, the application 11A and the load balancer 20A in the hub A have been launched, and the user terminal 30A is using the application 11A. In the hub B, the application 11B and the load balancer 20B have not been launched. A user terminal 30B wanting to use the application 11 exists, and the hub nearest to the user terminal 30B is the hub B.

The user terminal 30B transmits a packet addressed to the anycast address requesting the use of the application 11. The packet arrives at the nearest forwarding device 40B. In Example 2, the anycast address is assigned to the forwarding device 40B.

<FIG. 14: S202>

Figure 14:
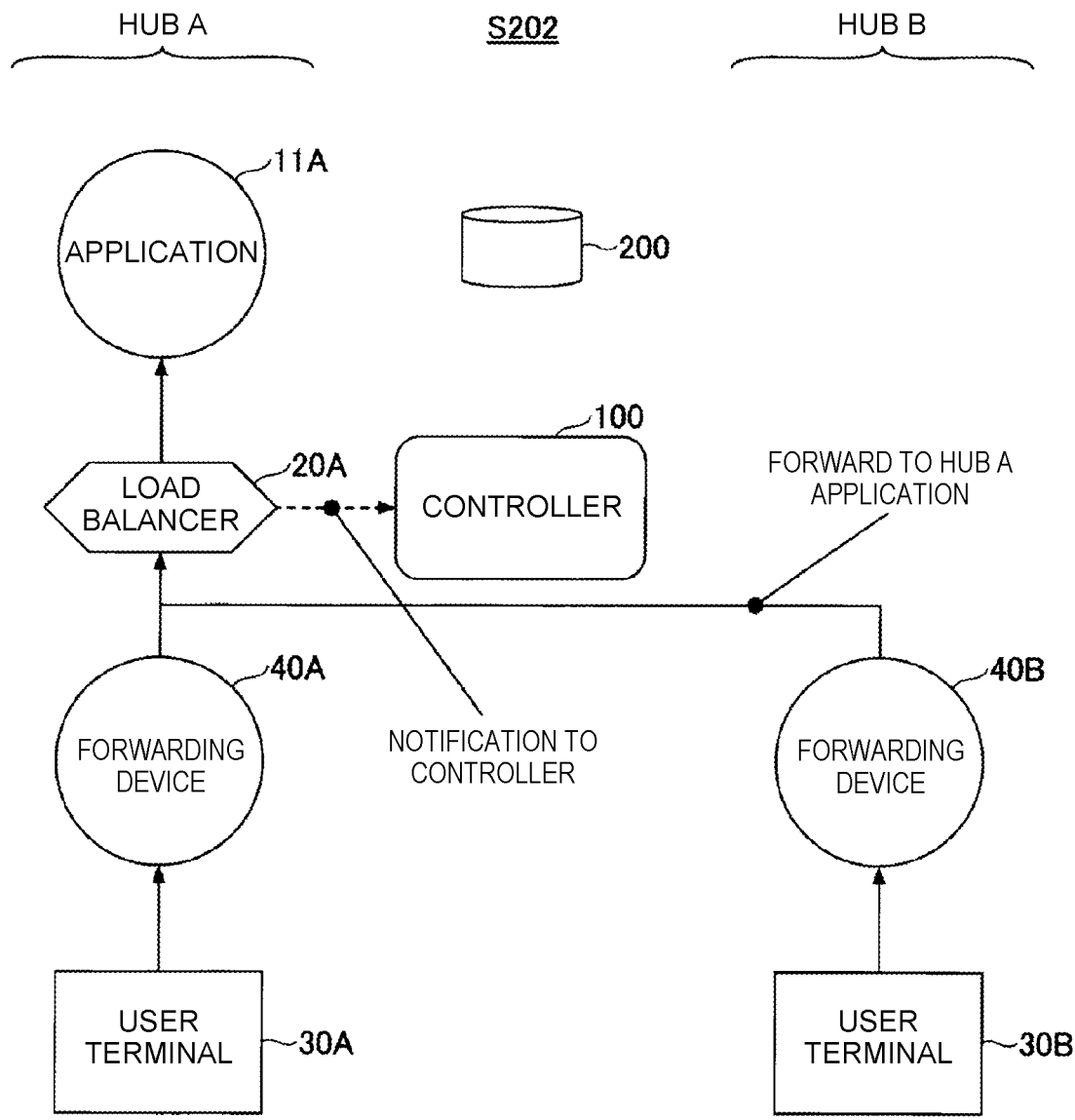
FIG. 14 is a diagram for explaining communication operations in Example 2.

In S202 of FIG. 14, the forwarding device 40B is one of the devices forming the UPF of a 5G network for example, and has an uplink classifier function that identifies packets intended for a specific IP address and routes the packets differently from normal. The forwarding device 40B according to the embodiment is set such that packets addressed to the anycast address are forwarded on a route leading to a hub other than the hub B.

Consequently, as illustrated in FIG. 14, the forwarding device 40B receiving packets from the user terminal 30B forwards the packets to the above route. The packets arrive at the application 11A or the load balancer 20A, which are the nearest nodes assigned the anycast address. FIG. 14 illustrates an example in which the packets arrive at the load balancer 20A. The packets are forwarded from the load balancer 20A to the application 11A. With this arrangement, the user terminal 30B communicates with the application 11A until the routing is switched (until the application 11B is launched) as described later. Hereinafter, the application 11A in the case where packets arrive at the application 11A from the forwarding device 40B will be indicated in parentheses as (application 11A).

The load balancer 20A (application 11A) detects that communication from the user terminal 30B, which should have been connected to the hub B originally, has been assigned to another hub, and notifies the controller 100 with information indicating the above. The information includes the source address of the packets received from the user terminal 30B. Note that the load balancer 20A (application 11A) detects from the source address of the packets that the communication from the user terminal 30B which should have been connected to the hub B has been assigned to another hub, for example.

In the controller 100, the information acquisition unit 110 acquires information including the above source address.

<FIG. 15: S203>

Figure 15:
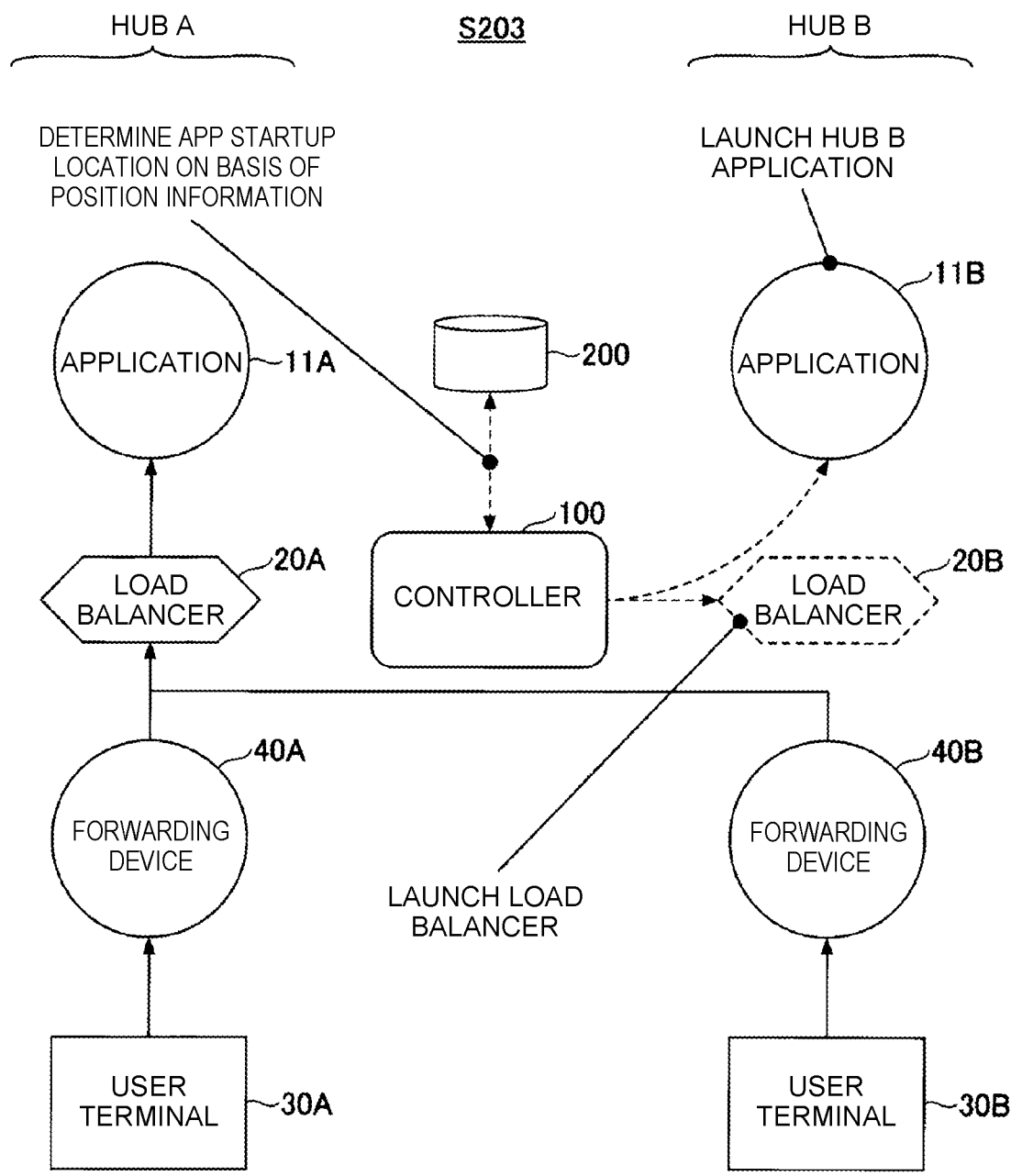
FIG. 15 is a diagram for explaining communication operations in Example 2.

In S203 of FIG. 15, the information acquisition unit 110 of the controller 100 transmits the source address (the address of the user terminal 30B) acquired from the load balancer 20B (application 11A) to the application information storage device 200.

The application information storage device 200 acquires position information corresponding to the source address (position information about the user terminal 30B) and the position information about each hub, and transmits the acquired information to the controller 100.

The information acquisition unit 110 of the controller 100 acquires the position information about the user terminal 30B and the position information about each hub from the application information storage device 200. Next, on the basis of the position information about the user terminal 30B and the position information about each hub, the determination unit 120 of the controller 100 determines that the hub nearest to the user terminal 30B is the hub B, and determines to launch the application 11B and the load balancer 20B in the hub B. The control execution unit 130 of the controller 100 launches the application 11B and the load balancer 20B in the hub B.

<FIG. 16: S204>

Figure 16:
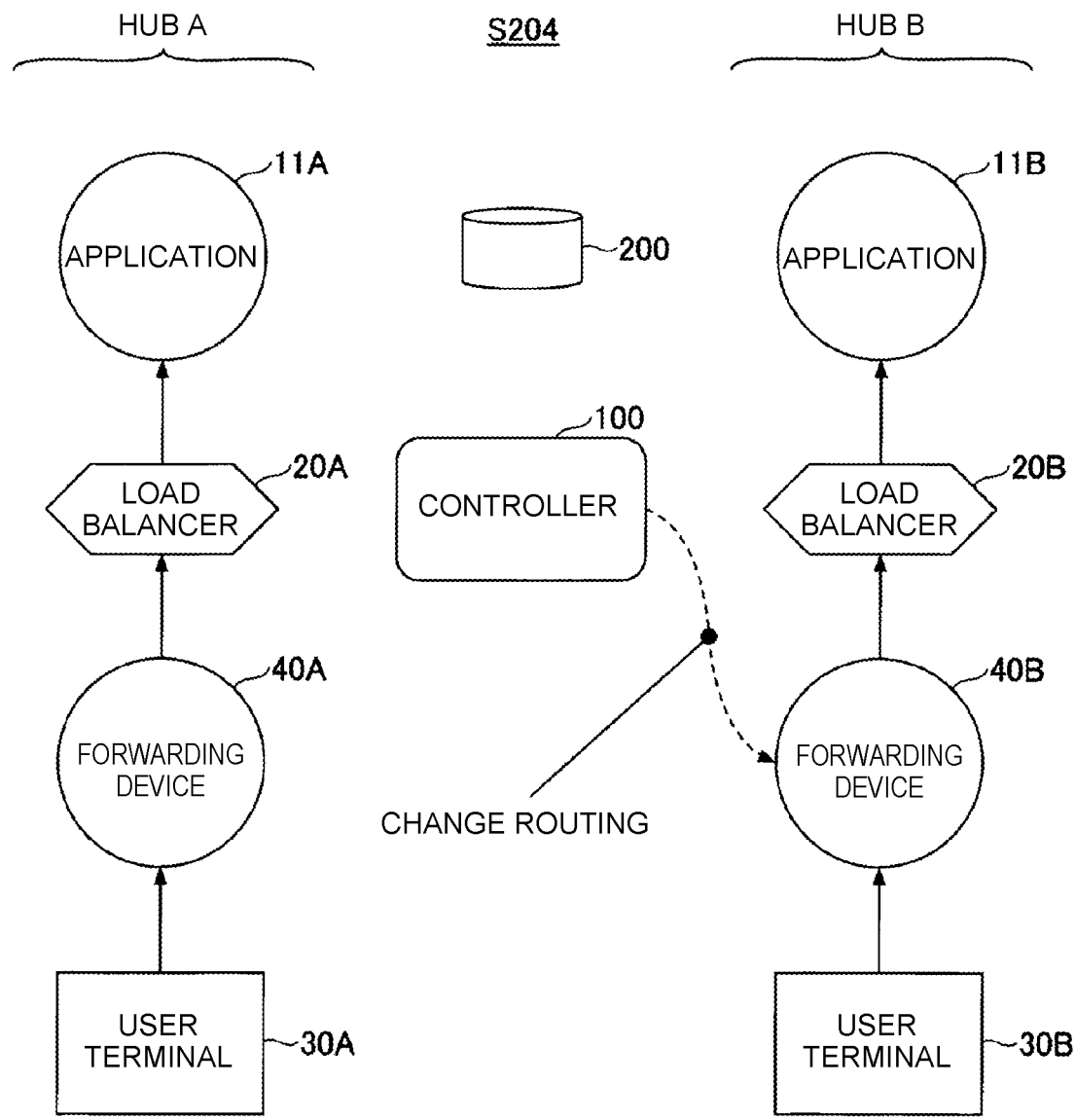
FIG. 16 is a diagram for explaining communication operations in Example 2.

In S204 of FIG. 16, if the determination unit 120 of the controller 100 determines that the application 11B has entered the standby state, the control execution unit 130 instructs the forwarding device 40B to change the routing such that packets sent from the user terminal 30B to the forwarding device 40B are forwarded to the load balancer 40B. Thereafter, packets from the user terminal 30B are sent to the load balancer 20B and forwarded to the application 11B.

The determination of whether or not the application 11B has entered the standby state is similar to Example 1.

Hereinafter, Examples 2-1 and 2-2 will be described. Examples 2-1 and 2-2 are examples of modifications to Example 2, but Example 1 may also be modified in a similar way.

Example 2-1

In Example 1 and Example 2, the IP address of the user terminal 30 is presumed to be an IP address according to the geographical location of the user terminal 30.

However, if the user terminal 30 connects to a mobile network (for example, 3G, LTE, or 5G), a mechanism (Session and Service Continuity) for preventing frequent changes of the IP address of the user terminal 30 may be implemented, and in this case, determining the geographical location of the user terminal 30 from the source address as described so far is more difficult.

On the other hand, it is possible to identify the geographical location by using a cell ID associated with the source address, or by using GPS information. Example 2-1 identifies the geographical location of the user terminal 30 according to such a method.

Example 2-1 is an example that anticipates the above situation in Example 2. In Example 2-1, the subscriber information storage device 300 that stores mobile network subscriber information is provided. The subscriber information storage device 300 may be a subscriber information storage device used on a mobile network or a device that stores information acquired from a subscriber information storage device used on a mobile network.

In the subscriber information storage device 300, an IP address of a user terminal and position information indicating the position where the user terminal is located are stored in association with each other for each user terminal, for example. "Position information indicating the position where the user terminal is located" refers to information such as the cell ID of a cell to which the user terminal is connected or position information acquired by a GPS device in the user terminal, for example. In Example 2-1, because the controller 100 can acquire geographical location information immediately from the cell ID, the cell ID is information that is substantially the same as position information.

In Example 2-1, the process of acquiring position information about the user terminal 30B described in FIG. 15 (S203) of Example 2 is different from Example 2. In Example 2-1, subscriber information including subscriber information about the mobile network to which the user terminal 30B is subscribed to is stored in the subscriber information storage device 300.

Figure 17:
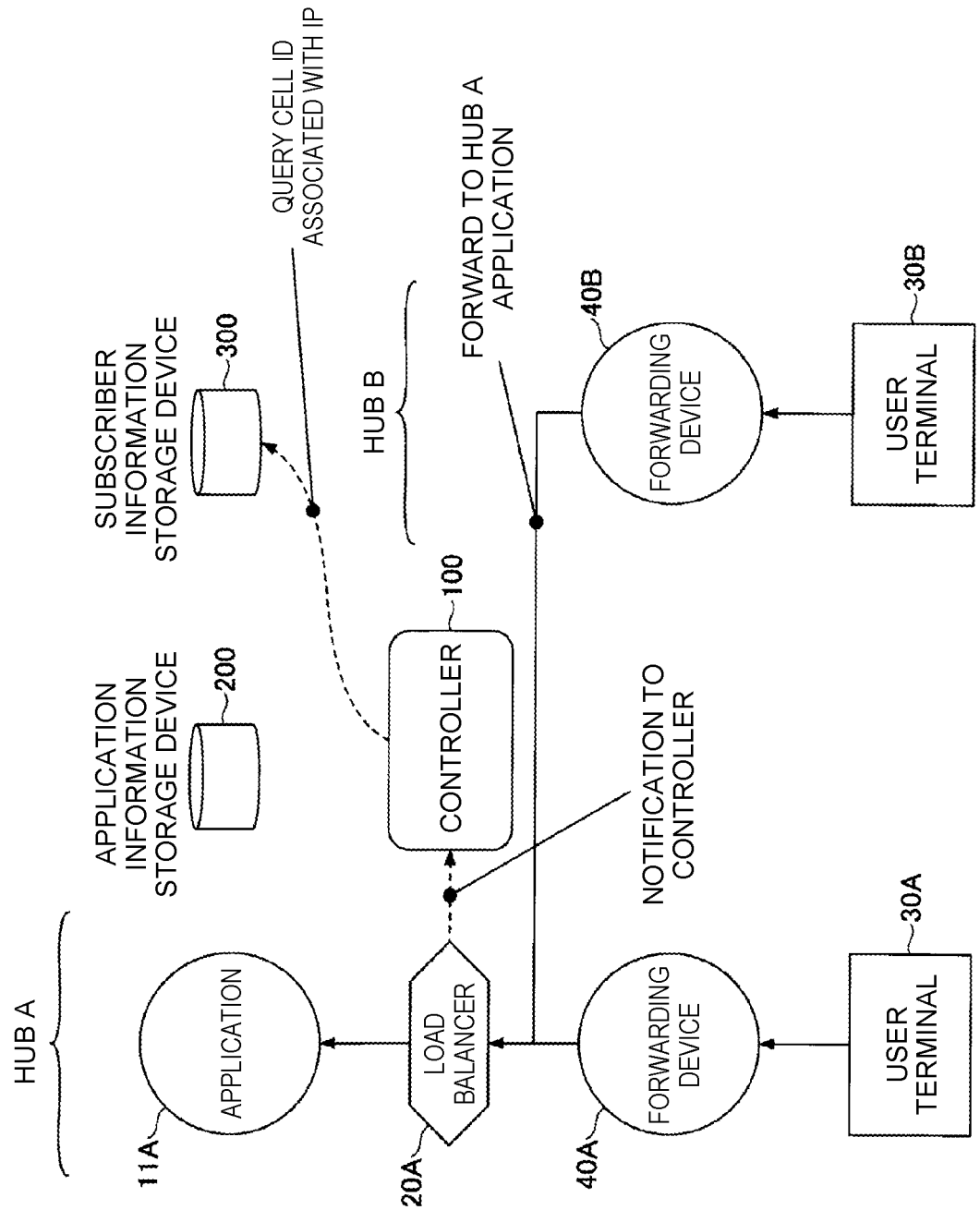
FIG. 17 is a diagram for explaining Example 2-1.

In Example 2-1, as illustrated in FIG. 17, after the controller 100 is notified of the source address of the user terminal 30B from the load balancer 20A (application 11A), the controller 100 transmits the source address to the subscriber information storage device 300. The subscriber information storage device 300 acquires position information corresponding to the source address (for example, the cell ID of the cell where the user terminal 30B is located), and transmits the acquired position information to the controller 100.

The information acquisition unit 110 of the controller 100 receives the cell ID and acquires position information from the subscriber information storage device 300, and acquires position information about each hub from the application information storage device 200. The process thereafter is the same as Example 2.

Example 2-2

Figure 18:
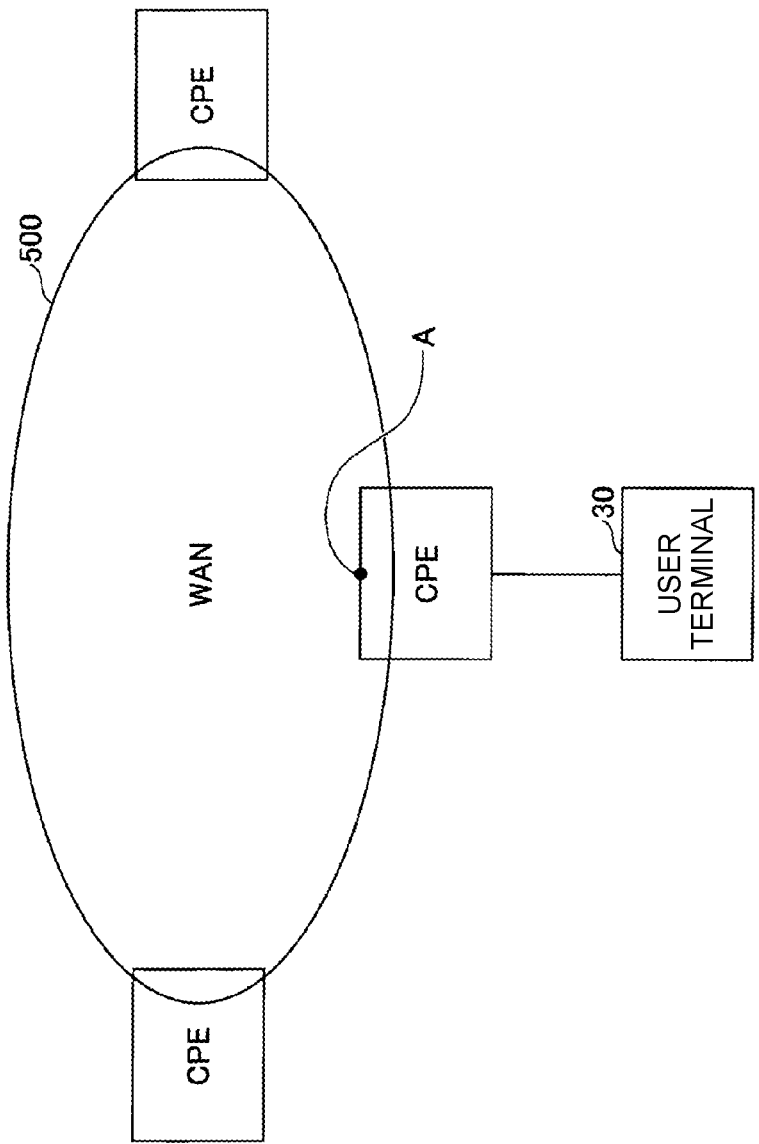
FIG. 18 is a diagram illustrating an example of an overlay NW.

Example 2-2 is an example of a case where the technology according to the embodiment is carried out on an overlay NW such as an SD-WAN. In Example 2-2, as illustrated in FIG. 18 for example, a plurality of customer-premises equipment (CPE) are included, and the user terminal 30 is connected to a network formed by interconnecting the CPE on a wide area network (WAN) 500.

The network 50 illustrated in FIG. 1 corresponds to the WAN 500, and equipment such as the computational resources 10, the load balancer 20, the controller 100, and the various storage devices illustrated in FIG. 1 are provided on the WAN 500.

In such an overlay NW configuration, each user terminal is assigned a private address on the overlay NW as an IP address. Consequently, with the method described in Examples 1, 2, and 2-1, position information about the user terminal 30 cannot be acquired from the source address of the user terminal 30.

On the other hand, on an overlay NW, the private address assigned to a user terminal, the CPE hosting the user terminal, and the IP address assigned outside the CPE (in the example of FIG. 18, the address of the portion labeled A) are typically managed by a management device.

Example 2-2 is an example that anticipates the above situation in Example 2. In Example 2-2, the CPE are assumed to be connected to a mobile network, and the external IP addresses of the CPE are managed as subscriber information in the mobile network together with information (such as the cell ID of the cell or GPS information) indicating the position where the CPE is located.

In Example 2-2, the subscriber information storage device 300 described in Example 2-1 and the overlay NW information storage device 400 storing information about the overlay NW are provided.

As described above, correspondence information associating the IP addresses of the CPE with information indicating position are stored in the subscriber information storage device 300. In the overlay NW information storage device 400, the private address of each hosted user terminal and an IP address assigned outside the CPE are stored in association with each other for each CPE.

In Example 2-2, the process of acquiring position information about the user terminal 30B described in FIG. 15 of Example 2 is different from Example 2.

Figure 19:
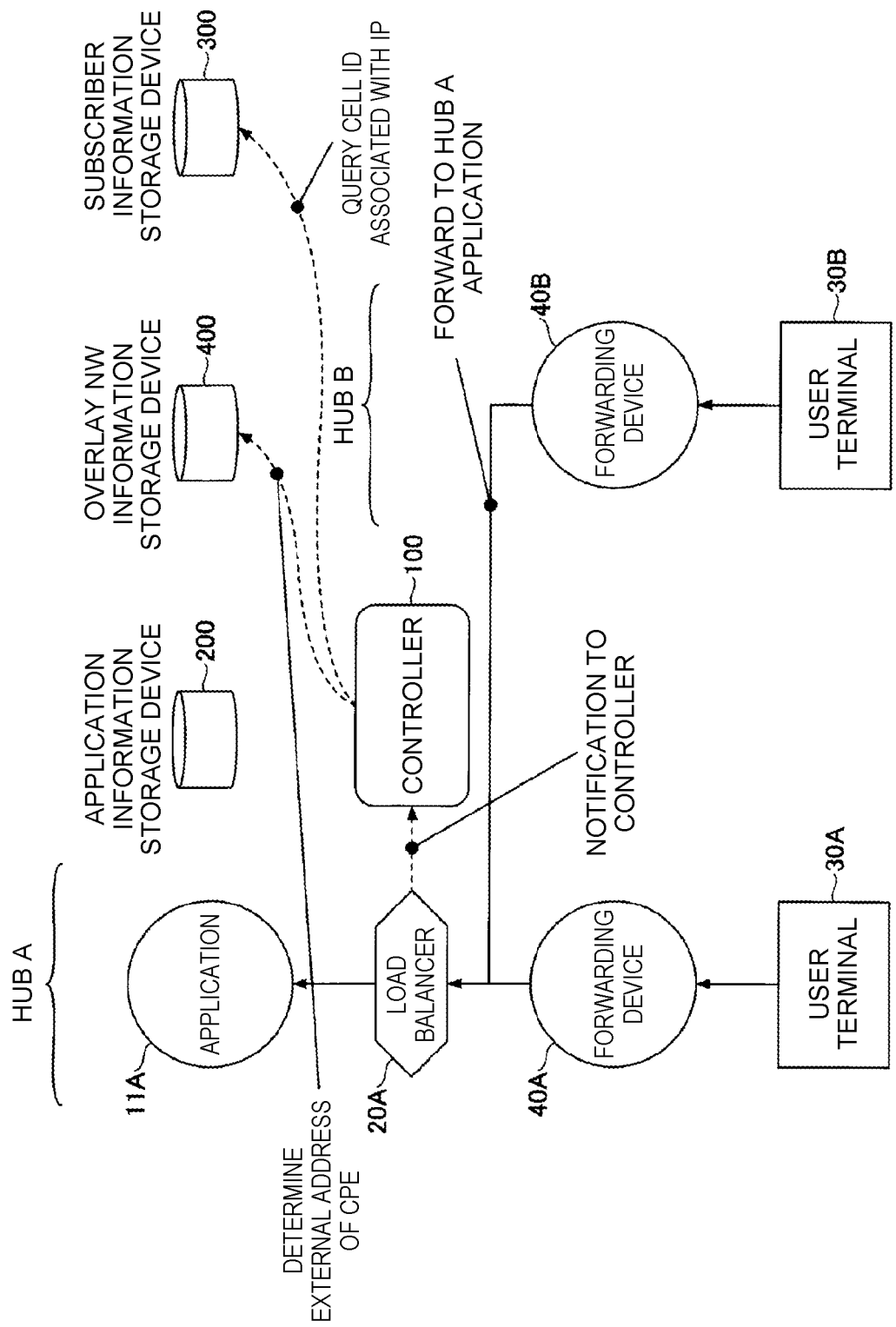
FIG. 19 is a diagram for explaining Example 2-2.

In Example 2-2, as illustrated in FIG. 19, after the controller 100 is notified of the source address of the user terminal 30B from the load balancer 20A (application 11A), the controller 100 transmits the source address to the overlay NW information storage device 400. The overlay NW information storage device 400 acquires the external IP address of the CPE corresponding to the source address (private address), and transmits the acquired external IP address to the controller 100.

The controller 100 receiving the external IP address of the CPE transmits the IP address to the subscriber information storage device 300. The subscriber information storage device 300 acquires position information corresponding to the IP address (for example, the cell ID of the cell where the CPE hosting the user terminal 30B is located), and transmits the acquired position information to the controller 100.

The information acquisition unit 110 of the controller 100 receives the position information (cell ID) of the CPE from the subscriber information storage device 300, and also acquires position information about each hub from the application information storage device 200. The process thereafter is the same as Example 2. In Example 2-2, the position of the CPE hosting the user terminal is considered to be the position of the user terminal.

Note that the subscriber information storage device 300 and the overlay NW information storage device 400 may also be collectively referred to as a "storage device that stores correspondence information associating the IP address of a user terminal with position information about the user terminal".

Summary, Effects, etc. of Embodiment

As described above, according to the embodiment, the user terminal is capable of using an application in the nearest hub without performing a complex process. Furthermore, the user terminal can start using the application with low latency. Further details are given below.

In the case where the user terminal uses an application in the nearest hub, if the application has not been launched at the time of use, and the user terminal waits until the application is launched, it will take some time until the user terminal uses the application.

On the other hand, if the user terminal continues to use an already-launched application in a hub that is not the nearest hub, there is a problem of being unable to enjoy good performance of the service utilizing low latency, wideband communication, and the like. Furthermore, the above situation is inefficient from a traffic management perspective.

According to the technology according to the embodiment, the above problems are addressed, making it to shorten the lead time until the start of application use without having the user terminal perform a complex process, while in addition, by using the nearest application after the nearest application is launched, better performance of the service can be enjoyed, and the traffic efficiency is also improved.

This specification discloses at least the control device, the control method, and the program described in each of the following items.

(First Item)

A control device comprising:

an information acquisition unit that receives a source address of a packet from a node that receives the packet transmitted from a user terminal, and acquires position information about the user terminal on a basis of the source address;

a determination unit that determines a hub to which the user terminal should connect, on a basis of the position information; and a control execution unit that launches an application in the hub and changes a routing such that packets transmitted from the user terminal are transmitted to the application.

(Second Item)

The control device according to the first item, wherein the hub to which the user terminal should connect is the hub closest to the user terminal.

(Third Item)

The control device according to the first or second item, wherein the information acquisition unit issues a query based on the source address to a storage device that stores correspondence information associating an IP address with position information, and thereby acquires the position information from the storage device.

(Fourth Item)

The control device according to any one of the first to third items, wherein a destination address of a packet transmitted from the user terminal is an anycast address, and the node is the node closest to the user terminal, and until the application is launched, the node forwards packets transmitted from the user terminal to an application in a hub different from the hub to which the user terminal should connect.

(Fifth Item)

The control device according to any one of the first to fourth items, wherein the information acquisition unit issues a query based on the source address to a subscriber information storage device that stores mobile network subscriber information, and thereby acquires the position information from the subscriber information storage device.

(Sixth Item)

A control method executed by a control device, the control method comprising:

an information acquisition step of receiving a source address of a packet from a node that receives the packet transmitted from a user terminal, and acquiring position information about the user terminal on a basis of the source address;

a determination step of determining a hub to which the user terminal should connect, on a basis of the position information; and a control execution step of launching an application in the hub and changing a routing such that packets transmitted from the user terminal are transmitted to the application.

(Seventh Item)

A program for causing a computer to function as each unit of the control device according to any one of the first to fifth items.

Although the foregoing describes an embodiment, the present invention is not limited to such a specific embodiment, and various alterations and modifications are possible within the scope of the gist of the present invention stated in the claims.

REFERENCE SIGNS LIST 10 computational resources
20 load balancer
30 user terminal
40 forwarding device
50 network
100 controller
110 information acquisition unit
120 determination unit
130 control execution unit
200 application information storage device
300 subscriber information storage device
400 overlay NW information storage device
500 WAN
1000 drive device
1001 recording medium
1002 auxiliary storage device
1003 memory device
1004 CPU
1005 interface device
1006 display device
1007 input device

The invention claimed is:

1. A control device comprising:
an information acquisition unit, including one or more processors, configured to receive a source address of a packet from a node that receives the packet transmitted from a user terminal, and acquires position information about the user terminal on a basis of the source address;
a determination unit, including one or more processors, configured to determine a hub to which the user terminal should connect, on a basis of the position information; and
a control execution unit, including one or more processors, configured to launch an application in the hub and changes a routing such that packets transmitted from the user terminal are transmitted to the application.

2. The control device according to claim 1, wherein the hub to which the user terminal should connect is the hub closest to the user terminal.

3. The control device according to claim 1, wherein the information acquisition unit is configured to issue a query based on the source address to a storage device that stores correspondence information associating an IP address with position information, and thereby acquires the position information from the storage device.

4. The control device according to claim 1, wherein a destination address of a packet transmitted from the user terminal is an anycast address, and the node is the node closest to the user terminal, and
until the application is launched, the node forwards packets transmitted from the user terminal to an application in a hub different from the hub to which the user terminal should connect.

5. The control device according to claim 1, wherein the information acquisition unit is configured to issue a query based on the source address to a subscriber information storage device that stores mobile network subscriber information, and thereby acquires the position information from the subscriber information storage device.

6. A control method executed by a control device, the control method comprising:
receiving a source address of a packet from a node that receives the packet transmitted from a user terminal, and acquiring position information about the user terminal on a basis of the source address;
determining a hub to which the user terminal should connect, on a basis of the position information; and
launching an application in the hub and changing a routing such that packets transmitted from the user terminal are transmitted to the application.

7. The control method according to claim 6, wherein the hub to which the user terminal should connect is the hub closest to the user terminal.

8. The control method according to claim 6, comprising:
issuing a query based on the source address to a storage device that stores correspondence information associating an IP address with position information, and thereby acquires the position information from the storage device.

9. The control method according to claim 6, wherein:
a destination address of a packet transmitted from the user terminal is an anycast address, and the node is the node closest to the user terminal, and
until the application is launched, the node forwards packets transmitted from the user terminal to an application in a hub different from the hub to which the user terminal should connect.

10. The control method according to claim 6, comprising:
issuing a query based on the source address to a subscriber information storage device that stores mobile network subscriber information, and thereby acquires the position information from the subscriber information storage device.

11. A non-transitory computer readable medium storing one or more instructions causing a computer to execute:
receiving a source address of a packet from a node that receives the packet transmitted from a user terminal, and acquiring position information about the user terminal on a basis of the source address;
determining a hub to which the user terminal should connect, on a basis of the position information; and
launching an application in the hub and changing a routing such that packets transmitted from the user terminal are transmitted to the application.

12. The non-transitory computer readable medium according to claim 11, wherein
the hub to which the user terminal should connect is the hub closest to the user terminal.

13. The non-transitory computer readable medium according to claim 11, wherein the one or more instructions cause the computer to execute:
issuing a query based on the source address to a storage device that stores correspondence information associating an IP address with position information, and thereby acquires the position information from the storage device.

14. The non-transitory computer readable medium according to claim 11, wherein:
a destination address of a packet transmitted from the user terminal is an anycast address, and the node is the node closest to the user terminal, and
until the application is launched, the node forwards packets transmitted from the user terminal to an application in a hub different from the hub to which the user terminal should connect.

15. The non-transitory computer readable medium according to claim 11, wherein the one or more instructions cause the computer to execute
issuing a query based on the source address to a subscriber information storage device that stores mobile network subscriber information, and thereby acquires the position information from the subscriber information storage device.

\* \* \* \* \*